No. 887,505. PATENTED MAY 12, 1908.
W. H. NELSON & L. W. GALLOWAY.
AIR CUSHION AND AIR COMPRESSOR FOR AUTOMOBILES AND OTHER VEHICLES.
APPLICATION FILED MAY 27, 1907.
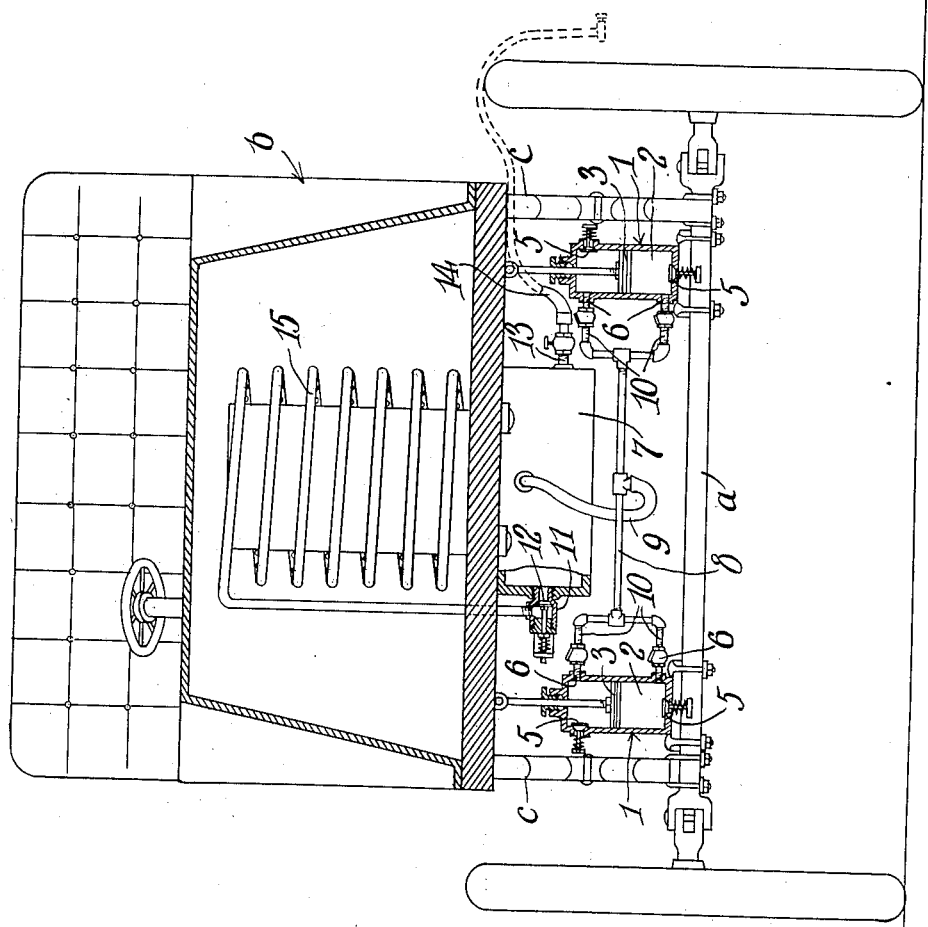
Witnesses
C. E. Smith
C. H. Giesbauer
Inventors
W. H. Nelson and
L. W. Galloway.
by H. B. Willson & Co.
Attorneys

UNITED STATES PATENT OFFICE.

WESLEY H. NELSON AND LEE W. GALLOWAY, OF NORWOOD, COLORADO.

AIR-CUSHION AND AIR-COMPRESSOR FOR AUTOMOBILES AND OTHER VEHICLES.

No. 887,505.           Specification of Letters Patent.           Patented May 12, 1908.

Application filed May 27, 1907. Serial No. 375,950.

*To all whom it may concern:*

Be it known that we, WESLEY H. NELSON and LEE W. GALLOWAY, citizens of the United States, residing at Norwood, in the county of San Miguel and State of Colorado, have invented certain new and useful Improvements in Air-Cushions and Air-Compressors for Automobiles and other Vehicles; and we do declare the following to be a full, clear, and exact description of the invention, such as will enable others skilled in the art to which it appertains to make and use the same.

Our invention relates to improvements in automobiles and other vehicles, particularly with reference to the provision of air compressing devices operated by the vibration of the vehicle and the vertical movements of the body thereof to compress air and form air cushions, auxiliary to the usual springs, to prevent shocks, enable the vehicle to ride easily and smoothly and furnish compressed air which is stored in a suitable reservoir and may be used for any appropriate purpose, such as for cooling the engine cylinder or cylinders, inflating the tires, and cooling the crank cases, as hereinafter described and claimed.

The accompanying drawing is a diagrammatic transverse sectional view of an automobile vehicle provided with air cushions and air compressing apparatus embodying our invention.

In accordance with our invention, we provide air compressing devices which also act as air cushions between the axle *a* and the body *b* of an automobile or other vehicle, in addition to the usual springs *c*. The said air compressing and air cushion devices may, within the scope of our invention be of any suitable construction. For the purposes of this specification, we show the same at 1 as double-acting air pumps, each comprising a cylinder 2 bolted to the axle *a* and a plunger 3 operating in the cylinder and connected to the body *b*. Normally, the plunger of each air compressor is about midway between the upper and lower ends thereof. Each end of each cylinder 2 is provided with a valve air inlet opening 5, and is also provided with a valve discharge opening 6, so that at each stroke of the plunger in either direction caused by the vertical movement of the body set up by the motion of the vehicle, or the vibration produced by the engine or engines, air will be drawn into one end of the cylinder and forced from the other end thereof. We also provide a compressed air tank or reservoir, indicated diagrammatically at 7, which is carried by the body and is connected by a pipe 8 to the discharge openings 6 of the air compressing cylinders, the said pipe including a flexible section 9 and branches 10, which lead to the said openings 6. It will be understood that continued action of the air compressing devices causes the cylinders and the tank 7 to become charged with compressed air, which acts with equal force above and below the plungers in the cylinders and forms air cushions above and below said plungers, which serve to cushion the vertical movement of the body of the vehicle, relieve the same of shock and cause the vehicle to run smoothly and easily and greatly promote the comfort of the occupants thereof.

The tank 7 is provided with a discharge pipe 11 and with a pressure-regulating valve 12 of any suitable construction, which may be set so as to predetermine the pressure in the air compressing pumps and cushions and in the tank 7, and so as to maintain any desired degree of pressure therein. The air thus stored and compressed in the tank 7 may be used for any purpose, such as for cooling the engine cylinder or cylinders, inflating the tires and cooling the crank casings.

For the purposes of this specification, the tank is shown as provided with a cock 13, to which a pipe 14 may be attached for use in inflating the tires and the pipe 11 is shown as leading to a coil 15, which surrounds the engine cylinder and is provided on the side next the cylinder with perforations which cause said coil to discharge compressed air against the cylinder after the air has been compressed in the tank to the required degree and to cool such cylinder. It will be understood that by the provision of the air pressure-regulating valve, the compressed air will only be available for use after it has reached a certain predetermined pressure.

In practice, we find that the motion of the body under the most usual circumstances is more than sufficient to keep the air compressing apparatus and air tank charged with compressed air at a high degree and that in fact the vibrations of the body imparted thereto by the engine when the vehicle is not in motion is sufficient to compress air to the required extent in the air compressors and in the tank.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claims.

Having thus described our invention, what we claim as new, and desire to secure by Letters-Patent, is,—

1. A vehicle having an air compressing apparatus comprising a plurality of double-acting air pumps mounted upon the wheel-axle and having the rods of their pistons connected to the bottom of the vehicle, an air reservoir fixed to said vehicle-bottom, an arrangement of pipes having communication with the cylinders of said pumps opening above and below the pistons of said pumps, and means delivering air pressure from said arrangement of pipes to said air-reservoir.

2. A vehicle having an air compressing apparatus comprising a plurality of double-acting air-pumps mounted upon the wheel-axle and having the rods of their pistons connected to the bottom of the vehicle, an air-reservoir fixed to said vehicle-bottom, an arrangement of pipes having communication with the cylinders of said pumps opening above and below the pistons of said pumps, and a pipe-coil having connection with said air-reservoir for utilizing the air-pressure thereof.

In testimony whereof we have hereunto set our hands in presence of two subscribing witnesses.

WESLEY H. NELSON.
LEE W. GALLOWAY.

Witnesses:
JAMES W. S. CROSS,
K. B. NORTHUP.